United States Patent [19]

Spock, Jr. et al.

[11] Patent Number: 5,326,074
[45] Date of Patent: Jul. 5, 1994

[54] ENHANCED SEALING ARRANGEMENT FOR A ROTARY VALVE SHAFT

[75] Inventors: Thomas F. Spock, Jr.; David Klotter; Steve Kirk, all of Cincinnati, Ohio

[73] Assignee: Xomox Corporation, Cincinnati, Ohio

[21] Appl. No.: 972,609

[22] Filed: Nov. 6, 1992

[51] Int. Cl.$^5$ .................. F16K 41/04; F16K 41/08
[52] U.S. Cl. ..................... 251/214; 251/312; 251/335.1; 277/106; 277/124
[58] Field of Search ............. 137/375; 251/214, 309, 251/312, 335.1; 277/105, 106, 124, 125

[56] References Cited

U.S. PATENT DOCUMENTS

| | | | |
|---|---|---|---|
| 2,441,705 | 5/1948 | Jacobsen | 277/106 |
| 3,521,856 | 7/1970 | Smith | 251/214 |
| 4,234,197 | 11/1980 | Amancharla | 277/125 |
| 4,475,712 | 10/1984 | DeJager | 251/214 |
| 4,512,586 | 4/1985 | Smith | 277/124 |
| 4,531,537 | 7/1985 | Smith | 251/214 |
| 4,886,241 | 12/1989 | Davis et al. | 251/214 |
| 4,930,748 | 6/1990 | Gonsior | 251/214 |
| 5,024,453 | 6/1991 | Suggs | 277/106 |
| 5,129,625 | 7/1992 | Wood et al. | 251/214 |
| 5,131,666 | 7/1992 | Hutchens | 277/124 |

Primary Examiner—George L. Walton
Attorney, Agent, or Firm—Frost & Jacobs

[57] ABSTRACT

A valve has an actuating shaft packing assembly for located in a valve enclosure cover for preventing leakage of process fluid into the space between the actuating shaft and the cylindrical sidewall of a bore in the cover. The assembly includes an annular lip located at the axial end of the bore proximal to the fluid control member. The lip extends axially away from the fluid control member. An annular sealing ring is positioned between the lip and the cylindrical sidewall of the bore and formed of a material having a greater coefficient of thermal expansion than the valve body or actuating shaft. The annular ring shrinks when cooled and increases the sealing effectiveness between the sealing ring and the lip for enhanced suppression of fluid flow between the sealing assembly and the cylindrical sidewall.

7 Claims, 3 Drawing Sheets

ENHANCED SEALING ARRANGEMENT FOR A ROTARY VALVE SHAFT

TECHNICAL FIELD

The invention relates to sealing for valve shafts, and more particularly concerns a sealing arrangement especially adapted for reducing and sensing leakage of a process media past a valve stem packing arrangement, especially when the valve is subjected to a wide range of extreme temperatures. The invention will be specifically disclosed in connection with a plug valve having a shaft sealed by a plurality of Chevron packing rings formed of a fluorinated hydrocarbon polymer.

BACKGROUND OF THE INVENTION

It is common prior art practice to seal a shaft with a packing arrangement formed by a plurality of stacked V-shaped rings. The V-shaped rings, commonly known as chevron rings, are generally disposed in a cylindrical packing chamber of a structural body in circumferential sealing relationship to the shaft. Follower rings are typically used to apply axially pressure against the stacked rings, and to axially compress the V-shaped rings in the packing chamber. Such axial compression tends to radially expand the rings and to assist in maintaining a sealing relationship between the stacked rings and the shaft (on the radially inward side of the V-shaped rings) and between the stacked rings and the cylindrical sidewall of the packing chamber (on the radially outward side of the rings).

Such V-shaped rings have been formed from a wide range of materials in the past. It is common, for example, to use elastomeric V-shaped rings formed from homogeneous rubbers in applications where relatively low pressures are encountered and where the fluid media does not damage the rubber. Similarly, fabric V-shaped rings coated with elastomers are often used on heavy duty equipment or when higher pressures are encountered. However, rubber and fabric materials are frequently unacceptable when corrosive media is handled since the corrosive material will often attack both the rubber and the fabric material. Under such conditions, the materials of choice for such V-shaped rings are molded fluorinated hydrocarbon polymers. One such fluorinated hydrocarbon polymer in common use is polytetrafluoroethylene. Many of these fluorinated hydrocarbons, including polytetrafluoroethylene, are inert to virtually all chemical media and are suitable for use with a wide variety of corrosive fluids. In addition, many of the fluorinated hydrocarbon polymers have extremely low coefficient of friction.

A problem arises, however, from the fact that valves used to control the flow of corrosive process fluids almost always are formed of metals, and that fluorinated hydrocarbon polymers have a high coefficient of expansion relative to most metals. In some industrial situation, valves are thermally cycled through extreme temperature ranges, as for example between very high temperatures of several hundred degrees F. to very low temperatures of 40 degrees below zero or lower. When cooled after exposure to elevated temperatures, fluorinated hydrocarbon polymers shrink more than the metallic components of a valve with which they are in contact. As a result, the sealing effectiveness between the radially outward sides of these fluorinated hydrocarbon polymers and the sidewall of the packing chamber is significantly reduced when the valve is cooled, even when the packing rings are initially compressed very tightly.

There have been many attempts to overcome the problems resulting from thermally induced relative dimensional changes between the metal valves and sealing material formed from fluorinated hydrocarbon polymers. For example, in U.S. Pat. No. 4,475,712 to DeJager, a patent assigned to the assignee of the present invention, a valve designed for operation under severe conditions, including extreme temperature ranges is disclosed. The valve disclosed in this patent houses the actuating shaft in a portion of the valve body that is integral to the valve portion defining the internal flow passage for the process fluid being controlled by the valve. The valve shaft is sealed by a sealing assembly that includes an annular seal ring and a two sets of polymeric V-shaped packing rings. The DeJager valve body includes an annular projection located at the outboard end of the bore (distal to the valving member) that extends inwardly (toward the valving member) into the bore, and in circumferentially spaced relationship to the shaft. The annular seal ring is fitted into the space between the projection and the cylindrical sidewall of the bore. The two stacks of V-shaped packing rings are disposed interiorly of the annular seal ring, between the shaft and cylindrical sidewall. The sealing assembly also includes a lantern ring located about the shaft between the two sets of V-shaped rings.

Like most valves for corrosive fluid media, the DeJager sealing assembly is formed of a material having a coefficient of thermal expansion which is substantially greater than the coefficient of expansion for either the valve body or the valve shaft. Consequently, when the valve is cooled to low temperatures, the sealing assembly tends to pull away from the cylindrical sidewall of the bore, thereby reducing the sealing effectiveness between the sealing assembly and the cylindrical sidewall. In order to protect against leakage of the process fluid media, the DeJager valve relies upon the seal between the inwardly extending annular projection and the annular seal ring.

While the sealing assembly for the shaft of the valve disclosed in the Dejager patent is very effective for stopping leakage of the process media along the valve shaft, even under conditions of thermally cycling through extreme temperature ranges, it suffers from the disadvantage of permitting considerable leakage in the space between the outer radial surfaces of the packing rings and the cylindrical sidewalls of the packing chamber whenever the valve is subjected to extremely low temperatures. Among other disadvantages, such leakage permits the process media to travel for a substantial distance from the process line, past the lantern ring interposed between the sets of packing rings, and close to the ambient atmosphere. Since the sealing assembly of the DeJager valve permits leakage past the lantern gland, it is not fully suitable for leak sensing at that location. Moreover, it is not fully suitable for the application of an inert fluid at the lantern ring at a pressure that is in excess of the process fluid pressure, as disclosed in U.S. Pat. No. 4,531,537, also assigned to the assignee of the present invention. In such pressurized inert fluid applications, any failure of the seals allows the flow of the higher pressure inert fluid into the process line, and does not allow the process fluid escape the confines of the valve body.

SUMMARY OF THE INVENTION

Accordingly, it is an object of the invention to provide a valve with a sealing assembly for preventing leakage of a process media into a bore accommodating the valve shaft during severe thermal cycling of the valve.

It is another object of the invention to provide a sealing assembly for a valve that effectively seals about a shaft at a location proximal to the valving member during extremely low temperature conditions.

It is yet another object of the invention to provide a sealing assembly for a valve that permits sensing of fluid leakage at a lantern ring positioned in a shaft bore for a shaft during extreme temperature fluctuations.

Another object of the invention is to provide a sealing assembly that can be installed in a valve enclosure cover for preventing leakage of process fluid media into an actuating shaft bore during extremely low temperature conditions.

Additional objects, advantages and other novel features of the invention will be set forth in part in the description that follows and in part will become apparent to those skilled in the art upon examination of the invention. The objects and advantages of the invention may be realized and obtained by means of the instrumentalities and combinations particularly pointed out in the appended claims.

To achieve the foregoing and other object and in accordance with the purposes of the present invention as described above, a valve assembly is provided having a valve body with an inlet, an outlet and a flow passage extending therebetween. A fluid control member is disposed in the flow passage between the inlet and the outlet for controlling the flow of fluid through the valve body. An actuating shaft is interconnected with the fluid control member and extends out of the body for effectuating rotation of the fluid control member. A structural member having a generally cylindrical internal bore with a cylindrical sidewall receives the shaft. The sidewall is radially spaced from the shaft to define a sealing cavity therebetween. The bore extends axially along the shaft from a first end located proximal to the fluid control member to a second end located distal to the fluid control member. An annular lip is located at the first end of the bore, proximal to the fluid control member and between the shaft and the cylindrical sidewall. The lip extends axially away from the fluid control member into the sealing cavity. The outer circumferential surface of the lip defines an annular sealing surface in generally parallel relationship to the cylindrical sidewall. A sealing means for inhibiting fluid flow between the shaft and the cylindrical sidewall includes an annular sealing ring and is positioned between the sidewall and the annular sealing surface of the lip. The sealing ring is formed of a material having a different coefficient of thermal expansion than the material of the structural member and is in contacting relationship with the annular surface. The sealing assembly increases the sealing effectiveness between the sealing ring seal and the annular sealing surface of the lip for enhanced suppression of fluid flow between the cylindrical wall and the sealing means whenever sealing pressure between the sealing means and the sidewall is reduced due to thermally induced relative dimensional changes between the structural member and the sealing means.

In accordance with one aspect of the invention, the structural member is a valve enclosure cover, and the cylindrical bore is at least partially contained within the valve enclosure cover.

In another aspect of the invention, the annular lip is formed as part of the valve enclosure cover.

According to another aspect of the invention, the sealing assembly includes a plurality of annular rings positioned between the actuating shaft and the cylindrical sidewall of the bore, and the sealing assembly further includes means for resiliently biasing the plurality of rings toward said annular lip.

In a preferred form of the invention, the annular rings are formed of a fluorinated hydrocarbon polymer, such as polytetrafluoroethylene.

In another specific aspect of the invention, the biasing means includes a plurality of Belleville springs positioned to urge the sealing assembly toward the fluid control member.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments and its several details are capable of modification in various obvious aspects all without departing from the invention. Accordingly, the drawing and description will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
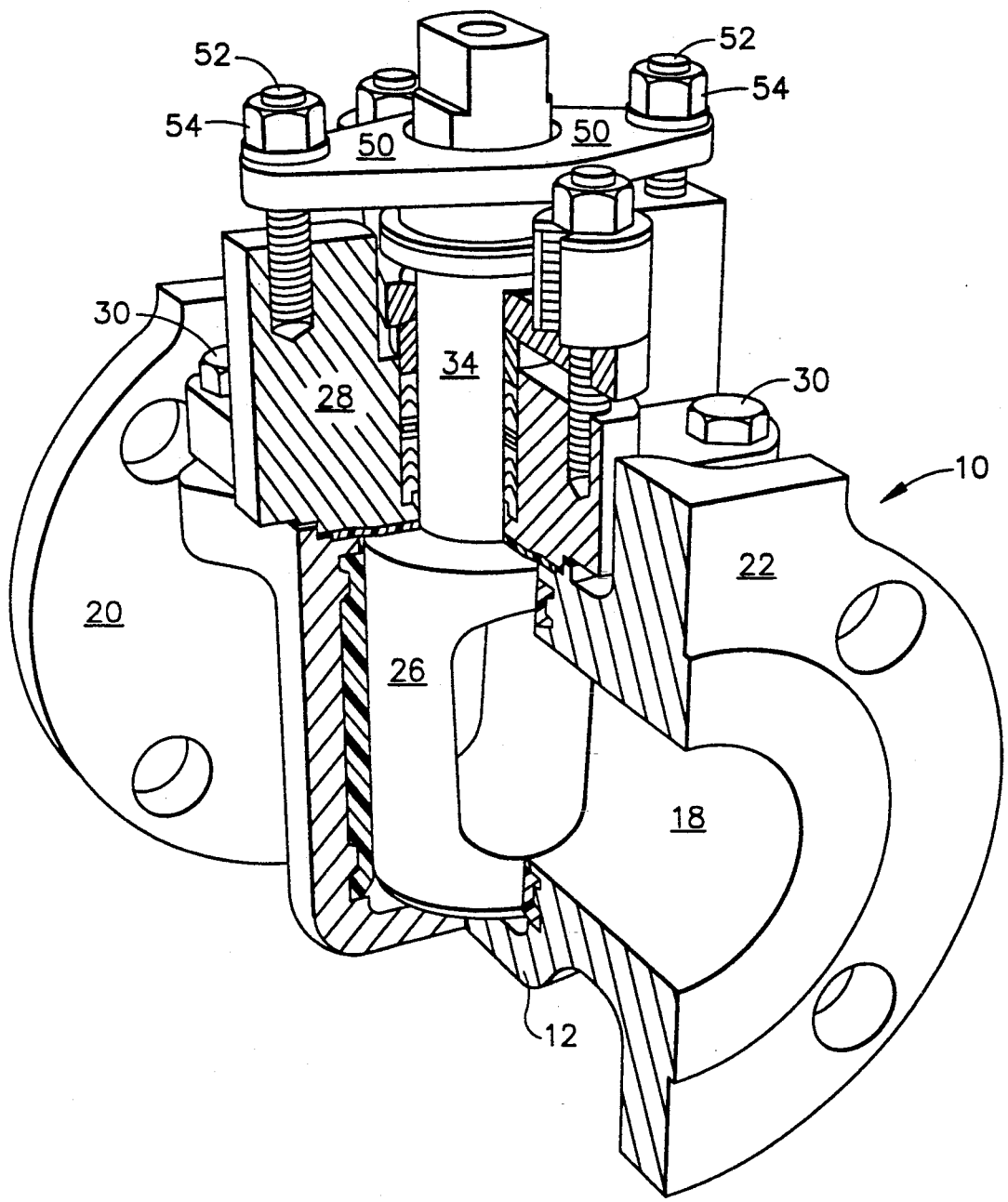
FIG. 1 is a perspective view, partially in section, of a plug valve utilizing a sealing assembly constructed in accordance with the principles of the present invention.
Figure 2:
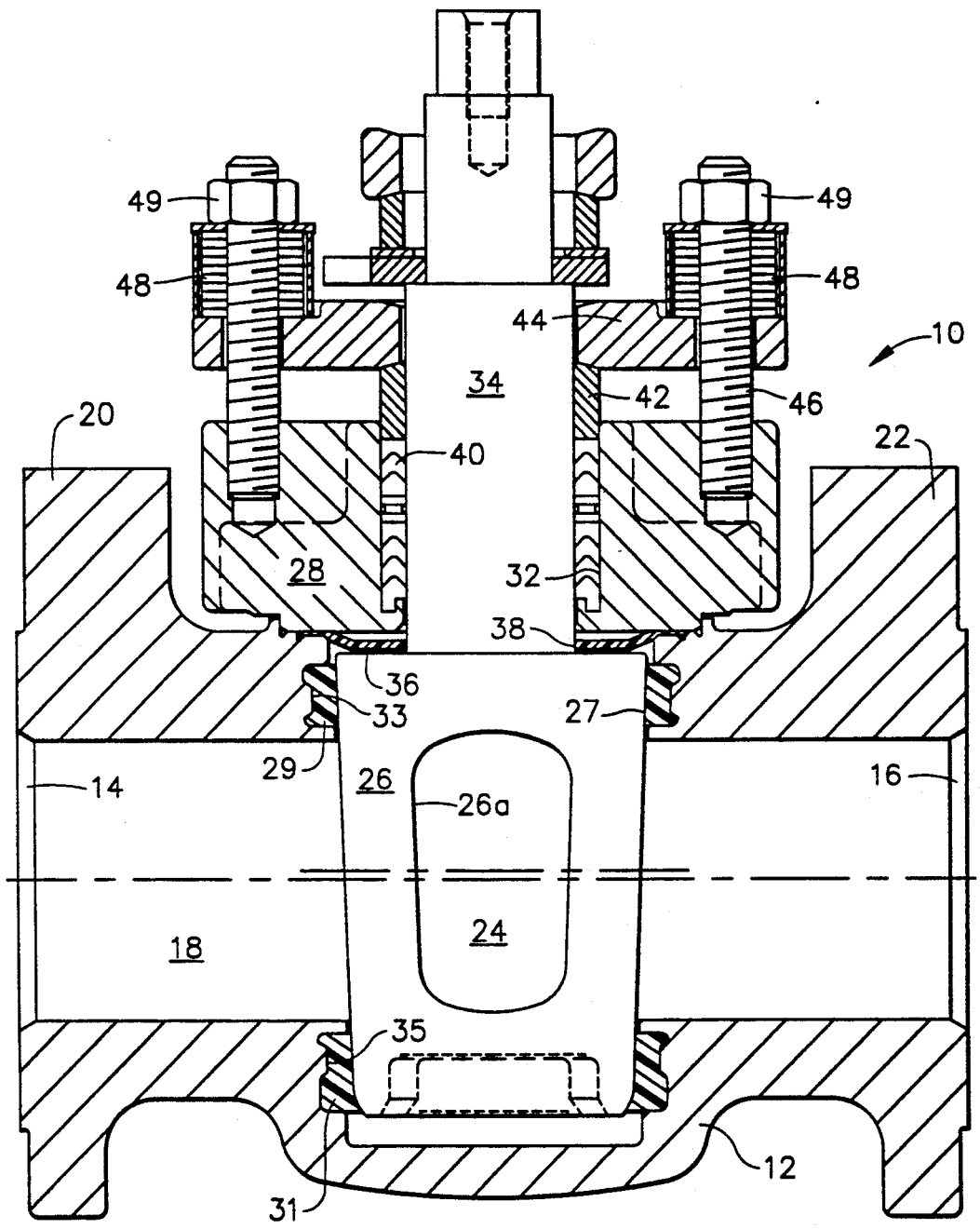
FIG. 2 is an elevational cross-sectional view of the plug valve illustrated in FIG. 1.

Referring now to the drawings, FIGS. 1 and 2 show a substantially conventional plug valve, generally designated by the numeral 10, having a sealing assembly constructed in accordance with the principles of the present invention. The valve 10 includes a valve body 12, which is provided with an inlet 14 and an outlet 16. An internal fluid flow passage 18 extends between the inlet 14 and outlet 16. The inlet 14 and outlet 16 are surrounded by flanges 20 and 22 respectively, by which the body 12 may be connected between similarly flanged conduits (not shown) by appropriate fasteners (not shown). It will also be appreciated that the valve body 12 may be connected to fluid conduits by any of a number of alternative methods, such as threaded connections, welding and various other means well recognized in the art.

The body 12 has a valve chamber 24 for accommodating a valving member 26, specifically illustrated as a plug member. The valve chamber 24 extends in a direction substantially perpendicular to the internal flow passage 18 and is closed at its lower end (as viewed in FIGS. 1 and 2), and open at its upper end (again, as viewed in FIGS. 1 and 2).

The valving member 26 has a through opening or passageway 26a which is brought into and out of registry with the internal flow passage 18 by rotating the valving member 26. A sleeve 27 is interposed between the valving member 26 and the valve chamber 24. The sleeve 27, which is preferably formed of a fluorinated hydrocarbon polymer, such as polytetrafluoroethylene, is apertured in correspondence with the valving member 26 so as to permit fluid flow therethrough when the valving member 26 is rotated into registry with the internal flow passage 18. The sleeve 27 has a pair of annular ribs 29 and 31 at its ends that are received in matching annular grooves 33 and 35 at the top and bottom of the valve chamber 24.

A valve closure cover 28 is secured to the top of the valve body 12 above the valve chamber 24 by a plurality of bolts 30 (two of which bolts 30 are shown in FIG. 1). The valve closure cover 28 functions to close the open end of the valve chamber 24, and includes a centrally disposed internal bore 32 for accommodating an actuating shaft 34. The shaft 34 is rigidly secured at its lower (as viewed in FIGS. 1 and 2) end to the valving member 26 and extends through the valve closure cover 28 to an external location where it may be attached to an appropriate actuator (not shown) such a lever, or an automated actuator. A diaphragm 36 is interposed between the valve body 12 and the valve closure cover 28. The diaphragm 36 is has a centrally disposed aperture 38 through which the actuating shaft 34 extends.

The bore 32 in the valve closure cover 28 has a generally cylindrical sidewall and houses a sealing assembly, which sealing assembly is generally designated by the numeral 40. The sealing assembly 40 is circumferentially fitted about the actuating shaft 34, in the annular space between the shaft 34 and the sidewall of the bore 32. An annular thrust collar 42 is positioned at the top of the sealing assembly 40, and is urged axially downwardly by a gland 44. The gland 44 is secured to the valve closure cover 28 by a pair of bolts 46. Each of the bolts 46 contain a plurality of Belleville washers 48, which Belleville washers 48 are tighten against the gland 44 through the agency of a nut 50. The Belleville washers serve to continuously apply axial pressure against the thrust collar 42, which thrust collar 42, in turn, applies axial pressure against the sealing assembly 40. This applies a resilient biasing force against the sealing assembly 40, and assists in maintaining adequate pressure against the sealing assembly 40 when thermally induced relative dimensional changes occurs between the sealing assembly 40 and the metallic components of the valve 10 with which the sealing assembly 10 is in contact.

FIGS. 1 and 2 also show an adjustable plug retaining assembly including a pair of outwardly extending arms 50 that are fitted around the TFS DEK SMK actuating shaft 34 TFS DEK SMK. The arms 50 are adjustably secured to the valve closure cover 28 by bolts 52 and nuts 54 to push the valving member 26 downwardly to enhance the seal between the valving member 26 and the sleeve 27.

Figure 3:
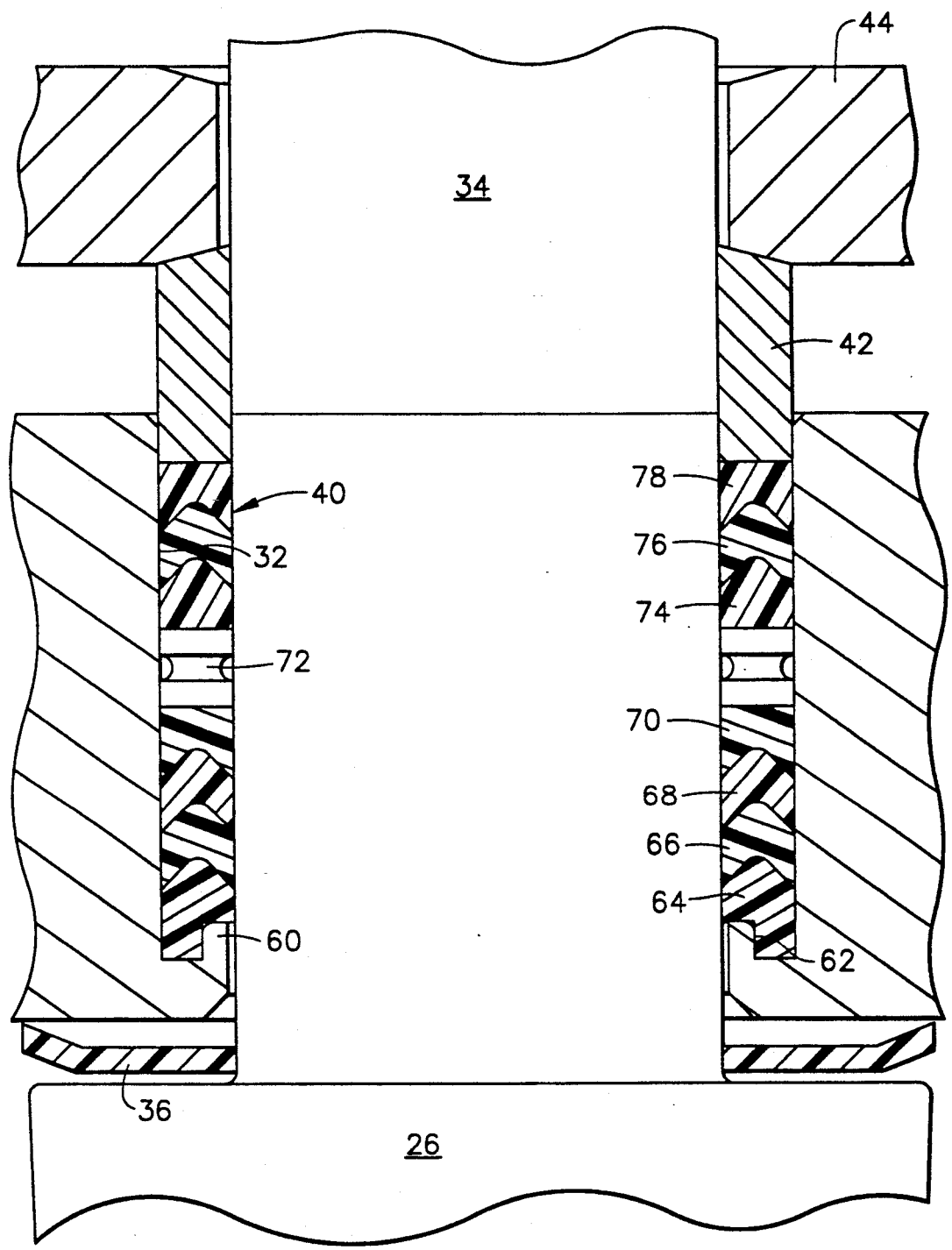
FIG. 3 is an enlarged cross-sectional view of the sealing assembly about the shaft of the valve of FIG. 2.

Turning now to FIG. 3, the sealing assembly 40 is shown in greater detail. Typically valve bodies and valve closure covers are formed of metallic material. In valves used for corrosive process fluids, sealing materials, such as packing rings used to seal valve shafts are primarily formed of fluorinated hydrocarbon polymer materials, materials that are inert to virtually all process media. As is well known, however, fluorinated hydrocarbon polymers have a high coefficient of expansion relative to most metals. Therefore, in valves designed for use in environments subject to thermal cycling throughout extreme temperature ranges, it becomes necessary to compensate for thermally induced relative dimensional changes between the metallic structural members and the sealing materials.

In accordance with one of the important aspects of the invention, the structural member circumferentially surrounding the actuating shaft 34, includes an annular lip 60 at the lower end of the bore 32, proximal to the valving member 26. The annular lip 60 extends axially upwardly away from the valving member 26 and into the bore 32, in concentrically spaced, generally parallel relationship to the cylindrical sidewall of the bore 32. The lip 60 has an annular sealing surface 62, which sealing surface 62 is engaged by a portion of an annular ring 64.

The ring 64 has an inverted V-shaped upper surface that is nested into the underside of a first set of V-shaped Chevron packing rings, comprising rings 66 and 68. The V-shaped ring 68 is, in turn, nested into the underside of a female follower ring 70. The opposite side of the follower ring 70 engages the underside of a lantern ring 72. As those skilled in the art will appreciate, such lantern rings are frequently used for sensing fluid leakage, or, in some instances, for applying a pressurized fluid media into the valve to prevent external fluid leakage upon the occurrence of a seal failure. A male follower ring 74 is located above the lantern ring 72 and this follower ring 74 nests into a V-shaped Chevron ring 76, which, in turn, nests into a female follower ring 78.

In summary numerous advantageous result from the practice of the invention. The illustrated sealing structure advantageously maintains its sealing integrity about the actuating shaft 34 throughout an extreme temperature range, including extremely low temperatures. When subjected to extremely low temperatures, the dimension of the sealing assembly 40, which is formed primarily of a fluorinated hydrocarbon polymer, tends to radially contract relative to the metallic valve enclosure cover. While this causes the sealing rings 62, 64, 66, 74, 76 and 78 to pull away from the cylindrical sidewall of the bore 32, it also causes annular sealing ring 64 to shrink relative to lip 60. This relative shrinkage increases the sealing pressure between the annular ring 64 and the sealing surface 62. Such increased sealing pressure increases the sealing effectiveness of the annular ring 64 and enhances the suppression of fluid flow between the cylindrical sidewall and the sealing assembly 40.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A valve assembly, comprising:
    a) a valve body, said valve body having an inlet, an outlet and a flow passage extending therebetween;
    b) a fluid control member disposed in the flow passage between the inlet and the outlet for controlling the flow of fluid through said valve body;
    c) an actuating shaft interconnected with said fluid control member and extending out of said body for effectuating rotation of the fluid control member;
    d) a structural member circumferentially surrounding said shaft, said structural member having a generally cylindrical internal bore with a cylindrical sidewall for receiving said shaft, said sidewall being radially spaced from said shaft to define a sealing cavity therebetween, said bore extending axially along the shaft from a first end located proximal to the fluid control member to a second end located distal to the fluid control member;
    e) an annular lip located at the first end of the bore proximal to the fluid control member, said lip being located adjacent to the fluid control member between the shaft and the cylindrical sidewall, said lip extending axially away from said fluid control member into said sealing cavity and forming an axial sealing surface at the outboard end of the lip opposite the valve control member, the outer circumferential surface of said lip defining an annular sealing surface in generally parallel relationship to the cylindrical sidewall;
    f) sealing means for inhibiting fluid flow between the shaft and the cylindrical sidewall, said sealing means including a plurality of annular sealing rings disposed in axially stacked relationship in said sealing cavity with a lip sealing ring positioned partially between the sidewall and the annular sealing surface of said lip, said lip sealing ring being formed of a material having a different coefficient of thermal expansion than the material of the structural member and being in contacting relationship with said annular surface whereby sealing effectiveness between the lip sealing ring seal and the annular sealing surface of the lip is increased for enhanced suppression of fluid flow between the cylindrical wall and the sealing means whenever sealing pressure between the sealing means and the sidewall is reduced due to thermally induced relative dimensional changes between the structural member and the sealing means; and
    g) means disposed at the second end of the bore for applying an axially compressive force against the plurality of annular rings, said force applying means being operative to enhance the sealing effect between the lip sealing ring and the axial sealing surface of the lip.

2. A valve assembly as recited in claim 1 wherein said structural member is a valve enclosure cover, and the cylindrical bore is at least partially contained within said valve enclosure cover.

3. A valve assembly as recited in claim 2 wherein the annular lip is formed as part of said valve enclosure cover.

4. A valve assembly as recited in claim 3 wherein said sealing assembly includes a plurality of annular rings positioned between the actuating shaft and the cylindrical sidewall of said bore, and further including means for resilient biasing the plurality of rings to toward said annular lip.

5. A valve assembly as recited in claim 4 wherein said annular rings are formed of a fluorinated hydrocarbon polymer.

6. A valve assembly as recited in claim 5 wherein the fluorinated hydrocarbon polymer is polytetrafluoroethylene.

7. A valve assembly as recited in claim 4 wherein said biasing means includes a plurality of Belleville springs positioned to urge the valve enclosure cover toward the fluid control member.

* * * * *

UNITED STATES PATENT AND TRADEMARK OFFICE
CERTIFICATE OF CORRECTION

PATENT NO. : 5,326,074
DATED : July 5, 1994
INVENTOR(S) : Thomas F. Spock, Jr., David Klotter & Steve Kirk It is certified that error appears in the above-indentified patent and that said Letters Patent is hereby corrected as shown below:

Column 8, line 37, (claim 4), delete "resilient" and substitute therefor --resiliently--; and Column 8, line 37, (claim 4), please delete the word "to".

Signed and Sealed this

Twentieth Day of September, 1994

Attest:

BRUCE LEHMAN

*Attesting Officer*  *Commissioner of Patents and Trademarks*